United States Patent Office 2,734,876
Patented Feb. 14, 1956

2,734,876

ALKYD RESINS MODIFIED WITH SUBSTITUTED CARBOCYCLIC ACIDS, AND COMPOSITIONS CONTAINING THE SAME

Theodore F. Bradley, Orinda, Calif., assignor to Shell Development Company, San Francisco, Calif., a corporation of Delaware No Drawing. Application May 2, 1950,
Serial No. 159,656

4 Claims. (Cl. 260—16)

This invention relates to synthetic resins of the alkyd type and to compositions containing the same. More particularly, the invention relates to a new class of modified alkyd resins and to their utilization, particularly in lacquers and other coating compositions.

Specifically, the invention provides new and particularly useful modified alkyds consisting of the resinous reaction product of a mixture comprising a polyhydric alcohol, a polybasic acid or derivatives thereof, and a modifying agent comprising a substituted carbocyclic monocarboxylic acid described hereinafter. The invention further provides compositions, particularly surface coating compositions, containing the aforedescribed resins.

Alkyd resins, i. e., resins prepared by reacting a polyhydric alcohol with a polybasic acid or derivatives thereof, are desirable materials for use in lacquers as they impart adhesion, gloss and depth of finish to the resulting films. Resins prepared from the polyhydric alcohols and polybasic acids or derivatives thereof alone, however, are generally inapplicable for this purpose and they must be modified by the addition of other ingredients. It has been proposed heretofore to modify these resins by the addition of compounds such as butyric acid, lactic acid and benzoic acid. Alkyd resins containing these proposed materials have met with some success in industry but they still leave much to be desired. Many of the lacquers containing alkyd resins modified with these agents, for example, form films which are relatively soft. As a result, objects coated with these lacquers require special packing and crating to prevent marring and scratching of the surface during shipping and storage. In addition, lacquers containing many of these modified resins form films having poor resistance to water and weather. Furthermore, alkyds modified with these materials generally have relatively low melting points and often are sticky. Many of these modified resins also have relatively high viscosities and poor solvent tolerance. These factors place a considerable restriction on the amount of resin that can be contained in the coating composition and therefore place distinct limitations upon the hardness, toughness, and durability of the lacquers which can be made from these resins.

It is an object of the invention, therefore, to provide a new class of modified alkyd resins. It is a further object to provide modified alkyd resins having improved properties as additives for coating compositions. It is a further object to provide a new class of modified alkyd resins which impart improved hardness and water resistance to lacquer films. It is a further object to provide modified alkyd resins having relatively high melting points and improved storage stability. It is a further object to provide modified alkyd resins having lower viscosities and improved solvent tolerance. It is still a further object to provide alkyd resins modified with substituted carbocyclic monocarboxylic acids, and a method for their preparation. It is a further object to provide surface coating compositions having many improved properties. Other objects and advantages of the invention will be apparent from the following detailed description thereof.

It has now been discovered that these and other objects may be accomplished by alkyd resins consisting of the resinous reaction product of a mixture comprising a polyhydric alcohol, a polybasic acid or polybasic acid anhydride, and a modifying agent comprising a substituted carbocyclic monocarboxylic acid containing at least one ring of six carbon atoms and having one of the said ring carbon atoms joined to a carboxyl group and another ring carbon atom joined to an aliphatic open-chain radical containing a quaternary carbon atom, said quaternary carbon atom preferably being not more than three carbon atoms removed from said ring. These modified alkyds have been found to be superior additives for many film-forming materials, particularly those containing the cellulose esters and ethers. These resins are compatible with film-forming materials and with the plasticizers and solvents generally employed therewith. Films prepared from compositions containing these novel resins have good gloss and improved toughness and adhesion. As the novel alkyds have lower viscosities larger quantities of the resin may be added to the composition and the films have great body and depth. In addition, films prepared from such compositions are harder than those containing the prior known resins and are able to withstand considerable pressure without being marred or scratched. Considerable advantage is also found in the fact that the novel alkyds have much higher melting points and are able to withstand longer periods of storage without becoming soft and sticky.

The discovery that superior alkyds could be obtained by the use of the above-described modifying agents was surprising in view of the fact that resins containing modifiers, such as benzoic acid and toluic acid, possessed quite different properties. Evidence of the unexpected superiority of the novel alkyds over the prior known resins may be found in the examples cited hereinafter.

As indicated, the acids used as the novel modifying agents comprise the substituted carbocyclic monocarboxylic acids containing at least one ring of six carbon atoms and having one of the said ring carbon atoms joined to a carboxyl group and another ring carbon atom joined to an aliphatic open-chain radical containing a quaternary carbon atoms, said quaternary carbon atom preferably being not more than three carbon atoms removed from the said ring. The carbocyclic ring may be aliphatic or aromatic and may be substituted if desired with non-interfering substituents, such as halogen atoms, alkoxy radicals, and lower alkyl radicals. The aliphatic open-chain radical attached to the carbocyclic ring may be saturated or unsaturated and may be further substituted with substituents, such as halogen atoms, nitro groups, and the like. Examples of the aliphatic open-chain radicals are tert-butyl, tert-octyl, tert-amyl, tert-hexyl, 2,2-diethylbutyl, 1,1-dimethylpropen-2-yl, 1-methyl - 1 - ethylhexyl, 1,1-dimethyl-3-chloropropyl, 1,1-dimethyl-3-cyanopropyl, 3,3-ditert-butylamyl, 1,1-diethyl-3-nitrohexyl, 3,3-diisopropylbutyl, and the like.

Illustrative examples of the above-described substituted carbocyclic acids are p-tert-butylbenzoic acid, p-(1,1-dimethyl-3-chloropropyl)-benzoic acid, p-tert-hexylbenzoic acid, m-tert-amylbenzoic acid, 4-tert-hexylcyclohexanecarboxylic acid, m-tert-octylbenzoic acid, m-tert-hexyl-p-chlorobenzoic acid, m-tert-butyl-p-tert-amylbenzoic acid, 3-tert-hexylcyclohexanecarboxylic acid, m-ethyl-p-tert-nonylbenzoic acid, m-chloro-p-tert-heptylbenzoic acid, m-cyano-p-tert-butylbenzoic acid, p - (3,3 - dipropylbutyl) - benzoic acid, p-(2,2-diethylhexyl)-benzoic acid, p-(1,1-dimethyl-3-nitropropyl)-benzoic acid, 2,5-dichloro-4-tert-octylbenzoic acid, 4-tert-amyl-1-anthroic acid, 4-tert-butyl-1-naphthoic acid, and m-(2,2-diisobutylhexyl)-benzoic acid.

Preferred acids to be used in the preparation of the novel alkyds are the aromatic monocarboxylic acids having one of the ring carbon atoms joined to a carboxyl group and having another ring carbon atom, preferably three carbon atoms removed therefrom, joined to a tertiary alkyl radical containing from 4 to 16 carbon atoms and preferably having the quaternary carbon atom not more than three carbon atoms removed from the aromatic ring. Examples of these preferred acids are p-tert-butylbenzoic acid, m-tert-hexylbenzoic acid, p-tert-nonylbenzoic acid, p-tert-dodecylbenzoic acid, 4-tert-amyl-1-anthroic acid, m-chloro-p-tert-hexylbenzoic acid, m-propyl-p-tert-heptylbenzoic acid, and the like.

Coming under special consideration particularly because of the fine quality of alkyds that may be produced therefrom are the aromatic monocarboxylic acids possessing a single aromatic ring wherein one of the ring carbon atoms is joined to a carboxyl group, another ring carbon atom three carbon atoms removed therefrom being joined to a tertiary alkyl radical containing from 4 to 10 carbon atoms wherein the quaternary carbon atom is preferably in the alpha position relative to the aromatic ring, and the remaining ring carbon atoms being joined to a member of the group consisting of hydrogen, halogen and lower alkyl radicals, preferably the straight chain alkyl radicals containing from 1 to 4 carbon atoms.

The polyhydric alcohols used in the preparation of the novel resins are those containing at least three esterifiable hydroxyl groups. The alcohols may be saturated, unsaturated, cyclic, alicyclic, heterocyclic or aromatic, and may be substituted with non-interfering substituents, such as halogens, thioether linkages, sulfinyl, sulfonyl, alkoxy, and the like radicals. Illustrative examples of such alcohols are glycerol, polyglycerol, pentaerythritol, mannitol, methyltrimethylolmethane, 1,4,6-octanetriol, 1,2,6-hexanetriol, 1,3,7-heptanetriol, polypentaerythritol, polyallyl alcohol, polymethallyl alcohol, tetrahydroxycyclohexane, trihydroxylbenzene, 3,5 - dithio-octanetriol-1,2,7, polyols formed by the condensation of bis-phenols with epichlorohydrin, and the like.

Preferred polyhydric alcohols to be used in producing the novel alkyds are the open-chain aliphatic alcohols possessing from 3 to 6 esterifiable hydroxyl groups and containing from 3 to 12 carbon atoms, such as glycerol, pentaerythritol, mannitol, 1,4,6-octanetriol, 1,3,5-hexanetriol, 1,5,10-dodecanetriol, bis-phenol-epichlorohydrin condensates, and the like.

The polycarboxylic acids which may be used in the preparation of the novel alkyd resins may be saturated, unsaturated, alicyclic, aromatic, and may posses two, three, four or more carboxyl groups and may be substituted or unsubstituted. Examples of such acids are malonic, glutaric, succinic, suberic, citric, aconitic, tricarballylic, cyclohexanedicarboxylic, maleic, fumaric, itaconic, citraconic, mesaconic, phthalic, isophthalic, terephthalic, 1,8-naphthalenic, adipic, sebacic, azelaic, pimelic, chlorosuccinic, bromomaleic, dichlorophthalic, dilactic, dihydracrylic, and benzophenone-2,4'-dicarboxylic acid.

The preferred polycarboxylic acids to be used in producing the novel alkyd resins are the dicarboxylic acids containing from 2 to 10 carbon atoms, such as succinic acid, glutaric acid, adipic acid, suberic acid, maleic acid, cyclohexanedicarboxylic acid, phthalic acid, diethyl phthalic acid, and the like. Particularly preferred polycarboxylic acids are the aromatic dicarboxylic acids containing from 6 to 10 carbon atoms wherein the two carboxyl groups are attached directly to the aromatic ring.

In some cases it may be desirable to utilize other forms of the acid, such as the acid anhydrides or the acid chlorides, as phthalic anhydride, maleic anhydride, succinic chloride, and the like.

Esters of the polybasic acids may be utilized in case the novel alkyds are to be produced by an ester-exchange reaction. Preferred derivatives to be used for this purpose comprise the esters of the above-described acids and the lower saturated monohydric alcohols, preferably those containing from 1 to 5 carbon atoms, such as methyl alcohol, ethyl alcohol, and amyl alcohol.

The above-described substituted carbocyclic monocarboxylic acids may be employed as the sole modifying agent or the said acids may be employed in combination with other types of modifiers. If other agents are employed their selection will depend chiefly upon the type of final product desired. Non-drying alkyds may be prepared by using modifying agents, such as the acids derived from coconut, castor and cottonseed oil, carboxylic acids as lactic acid, benzoic acid, chlorobenzoic acid, stearic acid, salicylic acid, mucic acid, sorbic acid, butyric acid, and propionic acid, and the like, as well as mixtures thereof.

Alkyds having air-drying properties may be prepared by employing various unsaturated modifying agents. Examples of such agents are the acids derived from the drying oils as linseed, soybean, perilla, tung, walnut, and oiticica oil, and the monoglycerides of the fatty acids of these drying oils, such as the monoglycerides of linseed oil, monoglycerides of the fatty acids of soybean oil, and the like, as well as mixtures thereof.

Other types of modifiers include the organic plastic substances, such as protein plastics, natural resins, such as rosin, and synthetic resins. Phenol-aldehyde, urea-aldehyde, alkyd resins and synthetic linear polyamides represent suitable condensation-type synthetic resin modifiers. Large numbers of synthetic resins resulting from the polymerization of unsaturated compounds can also be used as modifiers. Typical examples of this type of agent are resins formed from styrene, alpha-methylstyrene, vinyl chloride, vinylidene chloride, vinyl acetate, methyl acrylate, methyl methacrylate, and derivatives of some of these resins. Another group consists of plastics formed by the polymerization and copolymerization of conjugated dienes, such as butadiene, pentadiene, hexadiene. A special group consists of the resins formed from those compounds having two or more polymerizable non-conjugated double bonds, such as the unsaturated aliphatic polyesters of saturated polybasic acids, e. g., divinyl, diallyl and dimethallyl esters of oxalic, malonic, citric and tartaric acids; the unsaturated polyethers of saturated polyhydric alcohols, e. g., divinyl and diallyl ethers of glycol, diethylene glycol and the corresponding di- and triethers of glycerol, and the like; the unsaturated aliphatic monohydric alcohol esters of unsaturated monocarboxylic acids, e. g., vinyl, allyl, and methallyl acrylate; and the unsaturated esters of aromatic dicarboxylic acids, e. g., divinyl, diallyl and dimethallyl phthalate.

In addition to the modifiers already mentioned many other types of modifying agents may be employed. Important compositions are formed in many cases by adding before, during or after the formation of the alkyd materials such as colophony, shellac, copal, dammar, camphor, naphthalene, anthracene, aryl phosphates, alkyl and aryl phthalates, pitch, asphalt, asbestos, sand, talc, mica, wood flour, cotton, and the like.

Preferred modifying agents to be employed with the novel agents of the invention are the members of the group consisting of carboxylic acids, particularly unsaturated fatty acids, glyceride oils, synthetic resins, natural resins, and mixtures thereof.

In the preparation of the novel alkyd resins any one of the above-described polyhydric alcohols may be combined with any one of the above-described polybasic acids or derivatives thereof and any one of the above-noted substituted carbocyclic monocarboxylic acids, or mixtures of one, two or all three of the said reactants may be employed. If other types of modifying agents are to be used with the said carbocyclic acids they may be employed singly or in admixture with one another, e. g., a mixture of non-drying agents or drying agents, or a mixture of a non-drying agent with a drying agent may be utilized.

The production of the alkyds may be accomplished by any suitable method. They may be prepared, for example, by mixing the polyhydric alcohol, polybasic acid or derivative thereof and the modifying agent or agents in any order and then heating the resulting mixture, or alternatively, by first heating and reacting the polyhydric alcohol with the polybasic acid or derivative and subsequently adding the modifying agent or agents, or by first heating the alcohol with the modifying agent or agents and then adding the polybasic acid or derivative.

The resins are preferably prepared, however, by mixing the polyhydric alcohol with the polybasic acid or derivative and the desired modifying agent or agents, and subjecting the resulting mixture to heat. Ordinarily no catalyst need be employed to effect this reaction, but if desired substances, such as p-toluenesulfonic acid, zinc chloride, stannic chloride, calcium acetate, barium acetate, zinc acetate, hydrochloric acid, litharge, etc., in amounts preferably varying from 0.1% to 5% by weight of reactants may be employed.

The proportions in which the alcohol and polybasic acid or derivative are combined will vary over a considerable range. Ordinarily the polyhydric alcohol and polybasic acid or derivative will be employed in equimolecular amounts, but satisfactory results are obtained when there is up to 30 mol per cent excess of either reactant. Preferably, the polybasic acid or derivative is reacted with an equimolecular to 25 mol per cent excess of the polyhydric alcohol.

The amount of the modifying agent to be utilized will vary over a considerable range depending upon the type of product desired. The total amount of the modifying agent or agents will generally vary from 5% to 90% by weight of the resulting resin, with a preferred range varying from 30% to 60% by weight of the said resin. Higher or lower amounts may be employed, however, if desired or necessary. The entire quantity of the modifying agent may be made up of the abovedescribed novel substituted carbocyclic monocarboxylic acids, or part thereof may be replaced by any of the other agents described hereinabove. When mixtures of agents are employed, the ratio in which they are combined will vary according to the nature of the desired product but the amount of the substituted carbocyclic acids should preferably make up at least 2% and preferably from 5% to 60% of the total quantity of the modifying agent.

The temperature employed during the resin-forming reaction may vary over a considerable range depending upon the type of reactants, catalysts, etc. In most cases the temperature will range between about 100° C. and about 300° C., with a preferred range varying between 120° C. and 250° C.

The resin-forming reaction may be accomplished in the presence or absence of solvents or diluents. If solvents or diluents are employed it is desirable to utilize inert organic compounds, such as benzene, toluene, xylene, cyclohexanone, chloroform, carbon tetrachloride, and the like.

It is preferred in most cases to accomplish the resin-forming reaction under a blanket of an inert gas, at least during the initial stages of the reaction. By an inert gas is meant one substantially devoid of oxygen, such as nitrogen, carbon dioxide, and the like. Atmospheric, superatmospheric, or subatmospheric pressures may be used.

The water formed during the reaction may be removed during the said reaction or at its completion. It is preferably removed substantially as fast as it is formed therein. The removal of the water may be accomplished by any suitable means, such as distillation and the like.

Since the alkyds are heat-convertible, care should be taken during the reaction to avoid converting the resin to a step beyond that of being fusible. This will occur if the reaction mixture is overheated or heated too long.

To avoid such difficulty the course of the reaction is conveniently followed by making determinations of the viscosity and acid number upon samples withdrawn from the reaction mass or by other well known methods. Ordinarily the heating is continued until the viscosity has reached the desired value and the acid number has been reduced to a value between about 5 and 30.

When the reaction is substantially complete as shown by the above-described methods the inert solvents or diluents, remaining water, uncombined reactants and by-products are preferably removed from the reaction mixture. Removal is conveniently accomplished by vacuum distillation, although fractional distillation, precipitation, etc., may also be utilized.

If alkyd resins having extremely low acid numbers are desired they may be conveniently prepared by the ester-exchange method mentioned above. According to this process the esters of the polyhydric alcohol and/or esters of the polycarboxylic acids in the proportion described hereinabove for the alcohols and acids, are heated together in the presence of an ester-exchange catalyst, and the alcohol, acid or ester formed in the reaction is removed, preferably as fast as it is formed.

The novel modified alkyds of the invention may be utilized for a variety of important industrial purposes. They may be used, for example, as shellac substitutes, as a resinous binder for molding compositions and for many other uses in the various acts.

The alkyds are particularly valuable as additives for film-forming compositions. The air-drying alkyds of the invention, are useful, for example, as additives for synthetic and natural drying oils in the preparation of improved varnishes. The non-drying alkyds are especially valuable as additives for coating compositions containing amide-aldehyde-type resins, cellulose derivatives, and the vinyl-type polymers. The expression "amide-aldehyde-type resin" refers to the resinous products obtained by condensing aldehydes with amides. Such resins are sometimes referred to as "aminoplasts." Aldehydes used in producing this type of resin may be exemplified by formaldehyde or compounds engendering formaldehyde (e. g., paraformaldehyde, hexamethylene tetramine, etc.), acetaldehyde, propionaldehyde, butyraldehyde, acrolein, methacrolein, crotonaldehyde, benzaldehyde, furfural, etc., and mixtures thereof. The amides used in producing the said resins may be exemplified by urea, thiourea, diurea, hydroxy urea, ethanol urea, unsymmetrical diphenyl urea, diethylene triurea, methyl urea, acetyl urea, phenyl thiourea, asymmetrical diethyl urea, methylene ureas, guanidine, dicyandiamide, melamine, and the like.

The novel alkyds are especially valuable as additives for coating compositions containing cellulose derivatives, such as cellulose nitrate, cellulose acetate, cellulose acetate butyrate, cellulose propionate, cellulose isobutyrate, cellulose crotonate, cellulose stearate, and cellulose valerate; ethyl cellulose, methyl cellulose, benzyl cellulose, glycol cellulose, cellulose acetopropionate, cellulose acetotartarate, and the like, and mixtures thereof.

The preferred cellulose derivative to be used with the novel resin is nitrocellulose. Various grades of nitrocellulose may be employed. Ordinarily, R. S. ½ sec. nitrocellulose will be used, although lower viscosity grades like R. S. ¼ sec. or higher viscosity grades like R. S. 6 sec. may be employed if desired.

A single alkyd of the invention may be added to the above-described film-forming materials or solutions thereof, or a mixture of two or more of the said alkyds may be utilized. The amount of the alkyds to be added will vary over a considerable range depending upon the type of film-forming material, intended use of the finished product etc. In general, 1 part to 300 parts of resin will be used for every 100 parts of film-forming material. Ordinarily, in the production of coating compositions, such as lacquers, the amount of the alkyd will vary from 25 parts to 150 parts.

In the preparation of coating compositions, the alkyds and film-forming material are combined together in a liquid vehicle which is usually employed in the preparation of such coatings, as ethyl acetate, isopropyl acetate, n-butyl acetate, methyl ethyl ketone, isobutyl ketone, acetone, ethylene glycol ethyl ether, toluene, xylene, ethyl alcohol, n-butyl alcohol, various petroleum fractions, and the like, and mixtures thereof. The amount of the vehicle employed will vary over a wide range depending chiefly upon the viscosity desired in the finished solution. In general, amounts of vehicle varying from 5% to 95% of the total solids content are usually satisfactory.

Other materials, such as plasticizers like dibutyl phthalate, dioctyl phthalate, tricresyl phosphate, and the like, as well as additives, such as kopal, kauri, dammar and ester gum may also be added. If colored compositions are desired, pigments and coloring materials, such as titanium pigments, may be incorporated in appropriate amounts.

The coating compositions containing the novel alkyds are superior to many of the related coatings now available in industry. The compositions form finishings having excellent hardness, good gloss and improved resistance to water and alkali. Coating compositions in appropriate solvents may be applied to substantially any surface, such as steel or wood either primed or unprimed by spraying, brushing or other methods. The solvents may be evaporated at room temperature but in many cases it is preferred to bake the coatings by application of infra-red rays or in a suitable oven. In the latter case, high temperatures may be used without discoloring or causing decomposition of the coating.

The coating compositions may also be used to impregnate fabrics or glass fibers. It is also feasible to introduce the compositions into or to apply it to fibers, such as wood flour employed in the preparation of molding powders.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

*Example I*

(A) About 107.5 parts of tert-butylbenzoic acid, 80.8 parts of phthalic anhydride and 70.8 parts of glycerol were placed in a stainless steel bomb and heated upwards over a period of two hours to 220–240° C. and held in that range for 7.5 hours. A slow stream of carbon dioxide was sent through the charge to eliminate the air and carry away the water of esterification. The resulting product was a hard solid alkyd resin having a softening point of 79.9° C.

(B) An alkyd containing benzoic acid as the modifying agent was prepared by mixing 72.1 parts of benzoic acid, 80.8 parts of phthalic anhydride, and 70.8 parts of glycerol in a stainless steel bomb and heating the resulting mixture upwards over a period of two hours to 220–240° C. and held in that temperature range for 5 hours. A slow stream of carbon dioxide was sent through the charge as in (A) above. The resulting product was a soft, slightly tacky solid having a softening point of 55.3° C.

*Example II*

The following experiment illustrates the improved properties of the alkyds containing the substituted carbocyclic monocarboxylic acids, particularly as additives for lacquers containing nitrocellulose.

Lacquers were prepared containing one part of resin shown in the table below per part of nitrocellulose. As indicated, the alkyd modified with tert-butylbenzoic acid possessed low viscosity and greater tolerance to toluene than the alkyd modified with benzoic acid.

| Resin Constituent with Nitrocellulose | Viscosity | Tolerance to Toluene |
| --- | --- | --- |
| Alkyd resin modified with benzoic acid (Ex. I (B)). | 51.6 | Incompatible. |
| Alkyd resin modified with p-tert-butylbenzoic acid (Ex. I (A)). | 44.2 | Compatible. |

*Example III*

The superior hardness of nitrocellulose films containing the novel modified alkyd resins of the invention is shown in the following tests. Lacquers were prepared containing one part of resin shown in the table below per part of R. S. ½ nitrocellulose in a solvent consisting of 56% n-butyl acetate, 4% ethyl alcohol and 40% xylene. Films of these lacquers were cast on glass panels, forced dried two hours at 80° C. and then allowed to stand at room temperature. Seven days after casting the films were tested for hardness. The results are indicated in the table below:

| Resin Constituent with Nitrocellulose | Sward hardness seven days after casting |
| --- | --- |
| Commercial non-drying alkyd | 44 |
| Alkyd modified with benzoic acid (prepared in Ex. I (B)) | 46 |
| Alkyd modified with p-tert-butylbenzoic acid (prepared in Ex. I (A)) | 60 |

*Example IV*

About 180 parts of tert-butylbenzoic acid, 150 parts of phthalic anhydride and 150 parts of pentaerythritol are placed in a stainless steel bomb and heated upwards over 2 hours to 220–240° C. and held in that temperature range for 7 hours. A slow stream of carbon dioxide is sent through the charge as shown in Example I. The resulting product is a hard solid fusible alkyd resin.

*Example V*

A coating composition is prepared by mixing 1 part of nitrocellulose, 1 part of the modified alkyd prepared in Example IV and 0.2 part of dibutyl phthalate with a solvent comprising 19 vol. per cent n-butyl-acetate, 12 vol. per cent n-butanol, 30 vol. per cent toluene and 20 vol. per cent petroleum lacquer solvent. Films of this solution are cast on steel panels and dried at 80° C. for two hours and then allowed to stand at room temperature for several days. At the end of this period the films have good gloss and color and are very hard and flexible.

*Example VI*

About 180 parts of p-(1,1-dimethyl-3-chlorobutyl)-benzoic acid, 150 parts of phthalic anhydride, and 130 parts of 1,3,5-hexanetriol are placed in a stainless steel bomb and heated upwards over 2 hours to 220–240° C. and held in that temperature range for several hours. A slow stream of carbon dioxide is sent through the charge as shown in Example I. The resulting product is a hard fusible alkyd which is compatible with nitrocellulose and the solvents and plasticizers generally employed with the said nitrocellulose.

Alkyds having related properties are obtained by replacing the phthalic anhydride in the above-described process with equivalent amounts of each of the following acids or anhydrides: succinic anhydride, adipic acid, and chlorophthalic acid.

*Example VII*

About 190 parts of 4-tert-butylcyclohexanecarboxylic acid, 150 parts of phthalic acid and 120 parts of glycerol are placed in a stainless steel bomb and heated upwards over 2 hours to 220–240° C. and held in that temperature range for several hours. A slow stream of carbon dioxide is sent through the charge as shown in Example I. The resulting product is a hard fusible alkyd which is compatible with nitrocellulose and the solvents and plasticizers generally employed with the said nitrocellulose.

Nitrocellulose films containing the above-described alkyd possess good gloss and color and are quite hard and flexible.

*Example VIII*

About 290 parts of glycerol, 474 parts of distilled soybean acid 435 parts of phthalic anhydride, 9 parts of fumaric acid and 100 parts of p-tert-butylbenzoic acid were placed in a flask equipped with a phase separation head, thermometer well, stainless steel stirrer and carbon dioxide bubbler, and heated from 20° C. to 250° C. over a period of about 4 hours and then held at that temperature for about 45 minutes. The alkyd was blown for 20 minutes with carbon dioxide. The resin was then diluted while hot to approximately 50% solids with xylene. The final solution after filtering with the aid of Supercel had 51% non-volatiles and very light color. The resulting composition dried hard in 48 hours and "cotton-free" in 2 hours.

Alkyds having related properties are obtained by replacing the soybean acid in the above-described process with the following air-drying modifying agents, fatty acids or monoglycerides of dehydrated castor oil, linseed oil, tung oil, and mixtures of linseed oil and tung oil.

*Example IX*

White baking enamels were prepared from the soybean acid p-tert-butylbenzoic acid modified alkyd prepared in Example VIII according to the following formulas:

| I | Percent |
|---|---|
| Titanium dioxide | 31.8 |
| Alkyd resin solids | 28.8 |
| Melamine-formaldehyde resin solids | 5.3 |
| Solvent | 34.1 |
|  | 100.0 |

| II | Percent |
|---|---|
| Titanium dioxide | 31.8 |
| Alkyd resin solids | 34.1 |
| Solvent | 34.1 |
|  | 100.0 |

0.05% cobalt added based on resin solids.

Steel panels were coated with each of the enamels and the coatings cured for 30 minutes at 150° C. Both coatings had very high gloss and were hard and flexible.

*Example X*

About 80 parts of tert-decylbenzoic acid, 75 parts of sorbic acid, 150 parts of phthalic acid, and 130 parts of glycerol are placed in a steel bomb and heated upwards to 240° C. over a period of about two hours and then held at that temperature for several hours. A slow stream of carbon dioxide is sent through the charge as shown in Example I. The resulting product is a hard fusible resin compatible with nitrocellulose and the solvents and plasticizers generally employed with the said nitrocellulose.

Alkyds having related properties are obtained by replacing the sorbic acid in the above-described process with equal quantities by weight of each of the following modifiers: coconut oil acids, butyric acid, and lactic acid.

I claim as my invention:

1. A modified alkyd resin comprising the resinous reaction product of a mixture comprising phthalic acid anhydride, an equimolecular quantity of glycerol and 30% to 60% by weight of the said resin of p-tert-butylbenzoic acid.

2. A composition comprising nitrocellulose and a non-drying alkyd comprising the resinous reaction product of a mixture comprising phthalic acid anhydride, an equimolecular quantity of glycerol and 30% to 60% by weight of the resulting resin of p-tert-butylbenzoic acid.

3. A modified alkyd resin comprising the resinous reaction product of a mixture comprising phthalic acid anhydride, glycerol and as a modifying agent 5% to 90% by weight of said resin of p-tertiary butylbenzoic acid.

4. A composition comprising nitrocellulose and a non-drying alkyd comprising a resinous reaction product in accordance with claim 3.

References Cited in the file of this patent

UNITED STATES PATENTS

| 2,357,526 | Light et al. | Sept. 5, 1944 |
| 1,863,264 | Bradley | June 14, 1932 |

OTHER REFERENCES

Bennett: "Concise Chemical and Technical Dictionary," Chemical Publishing Co., 1947, page 472.